Patented May 8, 1951

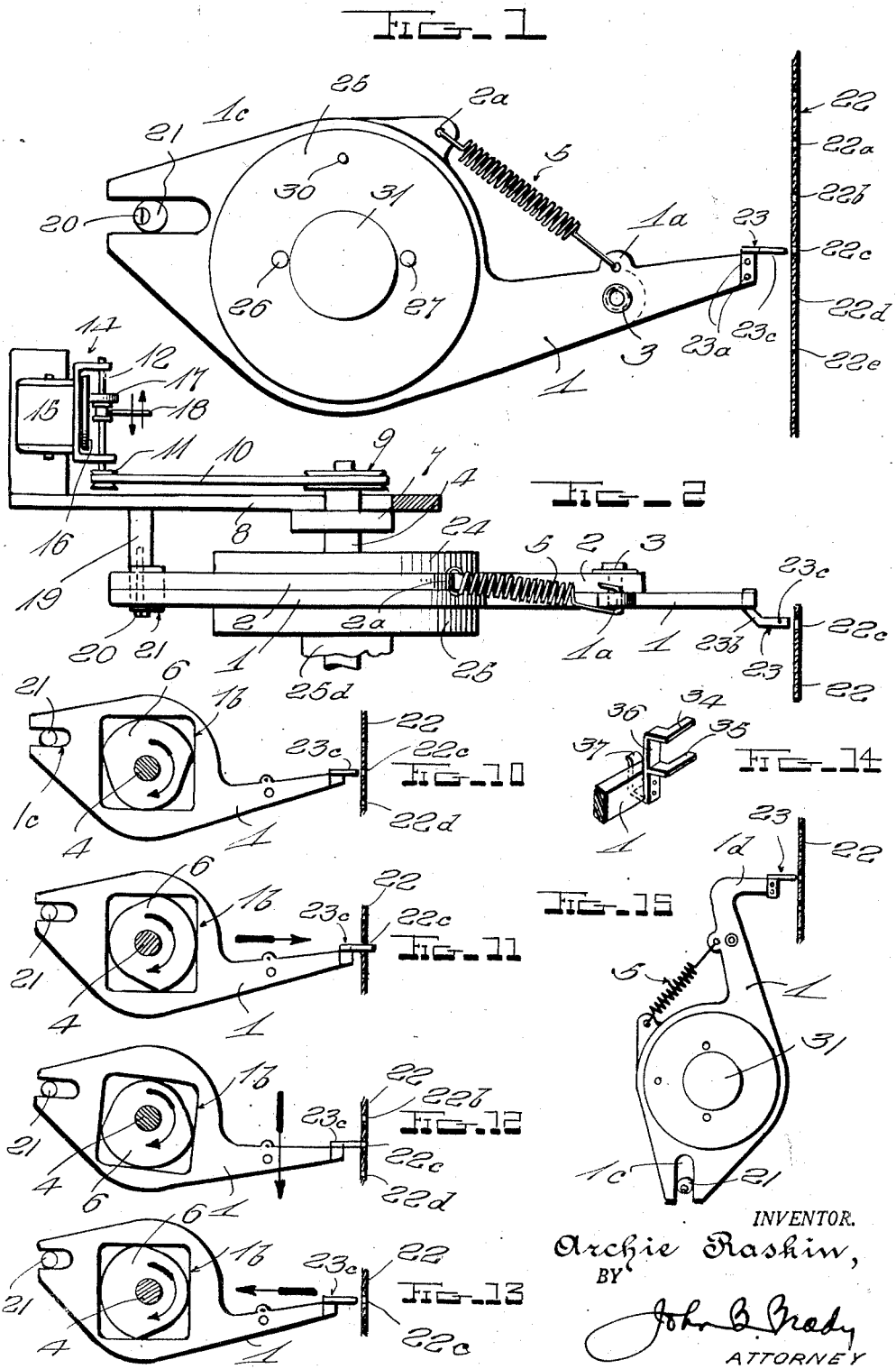
May 8, 1951 — A. RASKIN — 2,552,457
INTERMITTENT CLAW TYPE FEEDING MEANS FOR MOTION-PICTURE DRIVE MECHANISMS
Filed April 10, 1947 — 2 Sheets-Sheet 1
INVENTOR.
Archie Raskin,
BY John B. Brady
ATTORNEY

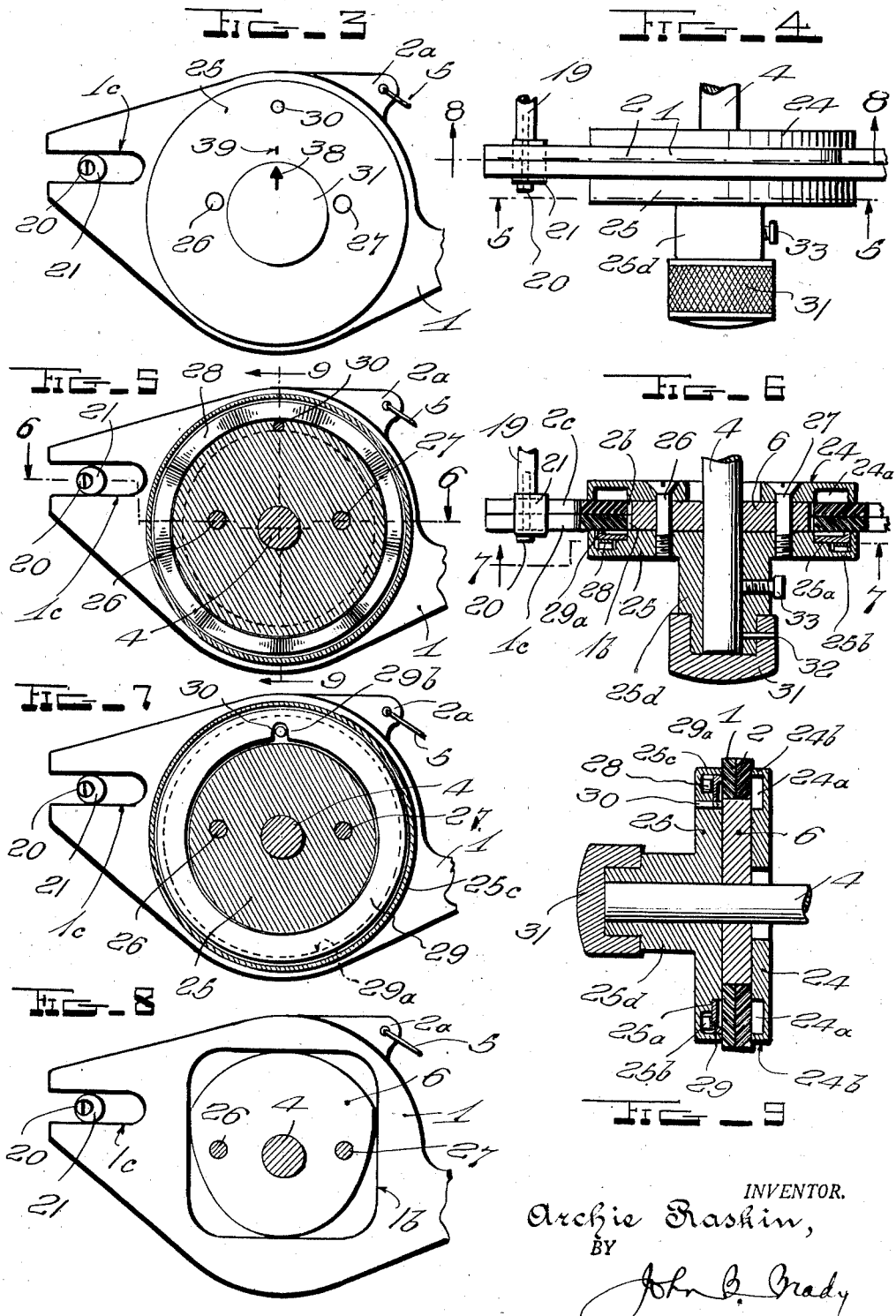

2,552,457

UNITED STATES PATENT OFFICE 2,552,457

INTERMITTENT CLAW TYPE FEEDING MEANS FOR MOTION-PICTURE DRIVE MECHANISMS

Archie Raskin, Englewood, N. J.

Application April 10, 1947, Serial No. 740,629

1 Claim. (Cl. 88—18.4)

My invention relates broadly to motion picture drive mechanism and more particularly to an improved construction of intermittent feed mechanism for motion picture projectors.

One of the objects of my invention is to provide a construction of film feeding mechanism for motion picture machines which is substantially silent in its operation and which includes compensation means for correcting for wear during effective life of the mechanism.

Another object of my invention is to provide a construction of motion picture film moving mechanism formed by a pair of mutually tensioned plate members of plastic material which coact with a cam mechanism and film engaging claw for intermittently driving the motion picture film.

Still another object of my invention is to provide a construction of angularly displaceable film moving mechanism in the form of a pair of coacting plastic plate members engageable over a driving cam with spring means for mutually tensioning the plate members for maintaining the plate members in engagement with the peripheral surface of the driving cam for effecting the intermittent movement of the film.

Still another object of my invention is to provide a construction of plastic drive claw for motion picture film mechanism which may be arranged in close proximity to the film either in a horizontally or vertically displaced position with respect thereto for imparting intermittent driving movement to the film.

A still further object of my invention is to provide an improved claw construction for motion picture drive mechanism in which a plastic member carries a multiple tooth claw member engageable with the perforations adjacent the marginal edge of the motion picture film for imparting intermittent movement thereto.

Other and further objects of my invention reside in an improved construction of silent drive for motion picture film mechanism as set forth more fully in the specification hereinafter following by reference to the accompanying drawings in which:

Figure 1 is an elevational view of the improved film driving mechanism of my invention in which the claw thereof is about to engage a perforation in the marginal edge of the associated motion picture film; Fig. 2 is a plan view of the film drive mechanism sown in Fig. 1; Fig. 3 is a fragmentary elevational view of the film driving mechanism illustrating the calibrations thereon and the eccentric adjustment associated therewith; Fig. 4 is a plan view of the mechanism illustrated in Fig. 3; Fig. 5 is a longitudinal sectional view taken substantially on line 5—5 of Fig. 4; Fig. 6 is a transverse sectional view taken substantially on line 6—6 of Fig. 5; Fig. 7 is a vertical sectional view taken substantially on line 7—7 of Fig. 6; Fig. 8 is a vertical sectional view taken substantially on line 8—8 of Fig. 4; Fig. 9 is a vertical sectional view taken substantially on line 9—9 of Fig. 5; Figs. 10, 11, 12 and 13 illustrate the progressive cycle of the film driving mechanism of my invention during the intermittent driving of the motion picture film; Fig. 14 is a perspective view of a multiple claw attachment for the film driving mechanism of my invention and Fig. 15 shows a modified construction of film driving mechanism in which the film driving mechanism is displaced along a vertical axis with respect to the film as compared to the displacement along a horizontal axis in the construction illustrated in Figs. 1–13.

Referring to the drawings in detail reference character 1 designates a plastic member which establishes surface contact with a coacting plastic member 2. The plastic members 1 and 2 are formed from thin flat plates of insulation material mutually pivoted at 3. The plate 1 is provided with a projecting lug 1a thereon immediately above the pivot 3, while the plate 2 is provided with a projecting lug 2a in a position approximately 45° off center from a vertical axis through the driving shaft 4. The lugs 1a and 2a form connecting means for opposite ends of the coil spring 5 for mutually tensioning the two plates 1 and 2.

The plates 1 and 2 are provided with aligned apertures 1b and 2b which are approximately polygonal in shape with rounded interconnecting internal portions within which the rotary driving cam 6 snugly fits. The rotary driving cam 6 is carried by driving shaft 4 which is journalled at 7 with respect to frame structure 8. The shaft 4 is provided with a driving pulley 9 on one end thereof which is engaged by pulley 10 driven from drive pulley 11 carried by shaft 12 of the variable speed driving mechanism represented generally at 14. The variable speed driving mechanism 14 includes the driving motor 15 which drives rotating disc 16 which serves as a friction wheel drive for the selectively displaceable rotatively driven wheel 17 carried on shaft 12. The rotatively driven wheel 17 may be angularly displaced by adjustment of lever arm 18 for determining the velocity of rotation of shaft 12 and correspondingly the rate of rotation of shaft 4 and cam 6 driven thereby. The frame 3 is provided with the horizontally extending member 19 thereon, the end of which is tapped and threaded to receive mounting screw 20 which serves to eccentrically mount the adjustable cam member 21. The adjustable cam member 21 has an effective diameter conforming with the width of the aligned slots 1c and 2c formed in the plastic members 1 and 2. The cam member 21 serves as a stud which is angularly rotatable by loosening mounting screw 20 for adjusting the position of both plastic members 1 and 2 with respect to the perforated motion picture film represented at 22 in Figs. 1, 2, 10–13, and 15. The motion picture film contains spaced perforations 22a, 22b, 22c, 22d, 22e, etc. which in the case of certain 8 mm. and 16 mm. film are located along one marginal edge only. On such 16 mm. film the other marginal edge serves as a carrier for the sound track.

My invention herein is applicable in film feeding mechanisms regardless of the structure of the film or the arrangement of marginal perforations therein, but for the purpose of illustrating my invention I have shown the structure of my invention utilized for the feeding of film perforated along one marginal edge thereof. The plastic member 1 is tapered to a terminus adjacent the film 22 and a steel claw 23 mounted thereon. Steel claw 23 is suitably attached to the terminus of plastic member 1 by appropriate means such as rivets 23a. The claw 23 has an angularly projecting portion 23b and a forwardly projecting engaging portion 23c shaped to enter and engage the apertures 22a, 22b, 22c, 22d, 22e, etc. of the motion picture film 22 in accordance with intermittent and forward movement imparted to the claw by operation of rotating cam 6.

The rotating cam 6 revolves within the polygonal shaped apertures 1b and 2b in plastic members 1 and 2. The plastic members 1 and 2 are restricted in a position to be guided by the periphery of rotatable cam 6 by means of side plate members 24 and 25. The side plate members 24 and 25 are substantially circular in contour and extend beyond the limits of the polygonal shaped apertures 1b and 2b in plastic plate members 1 and 2. Fastening screws 26 and 27 extend through plate member 24, cam member 6 and plate member 25 for assembling the plate members 24 and 25 on opposite sides of cam 6 and for confining plastic members 1 and 2 therebetween. Cam 6 serves as a spacer for positively spacing the plate members 24 and 25 with respect to opposite sides of plastic members 1 and 2 for the purpose of substantially reducing friction between the intermittently moving plastic members 1 and 2 and the rotatably moving plate members 24 and 25. To further reduce friction, I provide an assembly in which each of the plate members 24 and 25 are provided with annular recesses 24a and 25a respectively. The annular recess 25a in plate member 25 is further recessed as represented at 25b to serve as a housing for a substantially circular sinusoidal shaped spring member 28. Spring member 28 operates to yieldably press ring member 29 toward the flat face of plastic member 1.

In order to substantially reduce friction between ring member 29 and the face of plastic member 1, I provide a peripheral projecting annular edge portion 29a on ring member 29 which in coaction with the peripheral edge 25c of plate member 25 forms a bearing means between plate member 25 and the face of plastic member 1. To preclude any independent annular movement of ring member 29, I provide a notched recess 29b in one edge thereof which is engaged over pin 30 extending through plate member 25 for keying ring member 29 for movement with plate member 25. Similarly plate member 24 is provided with an inwardly directed circular peripheral edge 24b which establishes sliding contact with minimum friction with the surface of plastic member 2.

Plate member 25 has a cylindrical central hub 25d extending horizontally therefrom through which shaft 4 extends. The central hub 25d is reduced in section at the end thereof and over the end of reduced section I mount the finger grip knob 31. Finger grip knob 31 is keyed to hub 25d by means of pin 32. The finger grip knob 31 may be grasped by the fingers and the cam 6 revolved within the polygonal shaped recesses 1b and 2b within plastic members 1 and 2 for effecting adjustments in the position of claw 23c with respect to the perforations in the motion picture film. When the proper position has been selected which insures the proper functioning of the motion picture projector hub 25d is secured in position on shaft 4 by tightening set screw 33 thereby fastening hub 24d to move simultaneously with shaft 4.

In addition to the adjustment provided by knob 31 by which the position of cam 6 within the plastic members 1 and 2 may be selected, I also provide the means heretofore explained for adjusting the angular position of plastic members 1 and 2 about pivot 3 by adjustment of eccentric 21 upon loosening mounting screw 20.

In lieu of the single claw 23c heretofore explained, I may provide a construction of multiple claw for engagement of the perforations of the motion picture film. In Fig. 14 I have illustrated a claw containing a pair of parallel extending engaging teeth 34 and 35 interconnected by the vertically disposed strip member 36 which is provided with a U-shaped extension 37 on the end thereof embracing the terminus end of plastic member 1. The claws 34 and 35 are spaced a distance equal to the spacial relation of marginal perforations 22a, 22b, 22c, 22d, 22e, etc. in the motion picture film so that the film may be more effectively engaged and intermittently moved.

In Fig. 15 I have shown a modified arrangement of the motion picture feed mechanism in which the claw mechanism is shifted to a position in a vertical plane more closely aligned with the vertical path of movement of motion picture film 22. This provides for more convenient direct projection and renders the film driving mechanism capable of assembly in more compact relation to the projecting mechanism. In this modified arrangement the plastic member 1 has the terminus thereof angularly directed in a substantially horizontal direction as represented at 1d and directed toward the motion picture film 22. The claw 23 is attached to the angularly disposed terminus 1d for the intermittent engagement with the perforations in the motion picture film 22 in a manner similar to the form of my invention heretofore described. Spring means 5 is employed as heretofore described for tensioning the coacting plastic members 1 and 2 and extends, as heretofore explained, between lugs 1a and 2a on plastic members 1 and 2 for snugly engaging the periphery of cam member 6. A similar adjustment to that heretofore explained is provided by a corresponding arrangement of eccentric 21 operating in the coacting slots 1c and 2c of plastic members 1 and 2 on mounting screw 20.

In Figs. 10-13 I have illustrated the successive steps in the cycle of operation of the intermittent feed mechanism of my invention. In Fig. 10 I have shown the position of the claw 23c operating under the action of cam 6 about to enter the perforation 22c in motion picture film 22. As the cam 6 revolves clockwise as illustrated in Fig. 11 claw 23c advances extending through perforation 22c in film 22. As cam 6 revolves further in a clockwise direction plastic members 1 and 2 are displaced downwardly as represented in Fig. 12 pulling motion picture film 22 downwardly at the same time that claw 23c commences to withdraw from the perforation 22c. The final movement of the claw 23c is illustrated in Fig. 13 where further clockwise movement of cam 6 effects a complete withdrawal of claw 23c from perforation 22c, whereupon plastic members 1 and 2 are immediately restored to the initial engaged position illustrated in Fig. 10.

It will be observed that the depth of slots 1c and 2c in the plastic members 1 and 2 is adequate to allow displacement of the plastic members 1 and 2 for a distance adequate to effect clearance of claw 23c from film 22. Intermittent adjustments of the plate members 1 and 2 to permit the accurate functioning of the intermittent feed mechanism, as heretofore explained, are made by the finger control of knob 31 for revolving cam 6 to the desired operating position within the recesses 1b and 2b of plastic members 1 and 2 and by setting eccentric cam 21 in the proper angular position with respect to mounting screw 20.

The plastic plate members 1 and 2 are formed from relatively thin sheets of insulation material. The combined thickness of the plates 1 and 2 is substantially equal to the width of the cam 6. The continuous tensioning provided by spring 5 insures the snug gripping of the periphery of the cam by the plastic members. Angular adjustment of the cam 6 within the plastic members 1 and 2 is effected by movement of finger control knob 31 carrying calibration 38 which is adjustable with respect to calibration 39 on plate 25. The movement of the intermittent feed mechanism constituted by the plates 1 and 2 is a composite sliding, oscillatory and rotative movement which insures the advancing, the downward movement of the retraction of the mechanism claw 23.

I have found the film feed mechanism of my invention very practical in its construction, manufacture and operation. The fact that the intermittent feed mechanism may be constructed from plastic material insures substantially silent operation which is a very desirable feature in the operation of motion picture projectors. The fact that plastic may be used instead of metallic plates also substantially reduces cost of dies and manufacturing costs generally. The plastic plate members may be readily renewed from time to time at low cost which would not be the case if replacement of precision machined steel parts were required from time to time. I have used the mechanism of my invention with a high degree of success. I realize, however, that modifications in detail may be made and I desire that it be understood that no limitations upon my invention are intended other than may be imposed by the scope of the appended claim.

What I claim as new and desire to secure by Letters Patent of the United States is as follows:

Mechanism for intermittently moving film having spaced marginal perforations along the edge thereof comprising an arm of plastic material disposed in a position offset from the perforated marginal edge of an intermittently movable film, a metallic member having a portion embracing the bottom edge and opposite sides of said arm, means extending through the portions of said member that engage the opposite sides of said arm and through said arm for fastening said member on said arm, said member having a vertically extending portion projecting above one side of the end of the arm in a plane coplanar with the plane of the portion of said member which engages said side of said arm, a pair of substantially parallel extending spaced teeth carried by the vertically extending portion of said member and offset from the said side of said arm and directed beyond the end of said arm and engageable in the perforations in the marginal edge of the film for intermittently moving the film.

ARCHIE RASKIN.

REFERENCES CITED

The following references are of record in the file of this patent:

UNITED STATES PATENTS

| Number | Name | Date |
| --- | --- | --- |
| 1,935,058 | Nickerson | Nov. 14, 1933 |
| 2,033,225 | Bornmann | Mar. 10, 1936 |
| 2,095,744 | Hanna | Oct. 12, 1937 |
| 2,167,713 | Githers et al. | Aug. 1, 1939 |
| 2,200,342 | Reardon | May 14, 1940 |
| 2,384,597 | Calvin et al. | Sept. 11, 1945 |
| 2,427,568 | Nemeth | Sept. 16, 1947 |

FOREIGN PATENTS

| Number | Country | Date |
| --- | --- | --- |
| 669,109 | Germany | Dec. 16, 1938 |
| 501,188 | Great Britain | Feb. 22, 1939 |
| 694,576 | Germany | Aug. 3, 1940 |